(No Model.)

J. P. DWYER.
PIPE COUPLING.

No. 548,302. Patented Oct. 22, 1895.

Witnesses:
Raphaël Netter
Robt. F. Gaylord

Inventor
Joseph P. Dwyer
by Duncan & Page
Attorneys.

UNITED STATES PATENT OFFICE.

JOSEPH P. DWYER, OF BROOKLYN, ASSIGNOR TO JAMES WILLS, OF NEW YORK, N. Y.

PIPE-COUPLING.

SPECIFICATION forming part of Letters Patent No. 548,302, dated October 22, 1895.

Application filed May 11, 1895. Serial No. 548,893. (No model.)

*To all whom it may concern:*

Be it known that I, JOSEPH P. DWYER, a citizen of the United States, residing at Brooklyn, in the county of Kings and State of New York, have invented certain new and useful Improvements in Pipe-Couplings, of which the following is a specification, reference being had to the drawings accompanying and forming a part of the same.

The invention which forms the subject of my application is an improvement in devices for effecting a tight joint between two pipes. Couplings especially designed for this purpose and in which other means than the registering screw-threads are employed to obtain a water and steam-tight joint have heretofore been made, one form of such couplings having been formed with an annular recess for containing a soft metal, such as lead, which, after the coupling has been screwed over the ends of the pipes, has been forced by different means into the threads of the pipe. In certain other devices the material of the coupling itself has been corrugated by a tool similar to a dull pipe-cutter, so as to form internal ribs of slightly less diameter than the pipe which is to be driven into the sleeve or coupling, but in such and similar devices the objects sought are not the same as those secured by my invention.

My improvement consists in a threaded sleeve or coupling of wrought or malleable iron or steel of the ordinary kind, except that at two or more points near its ends the material is reduced in thickness, as by having circumferential grooves cut in it, whereby the threads of the sleeve itself at such points may be compressed by a tool into the threads of the pipe, and thus form a tight joint.

This device is illustrated in the accompanying drawings, in which—

Figure 1:
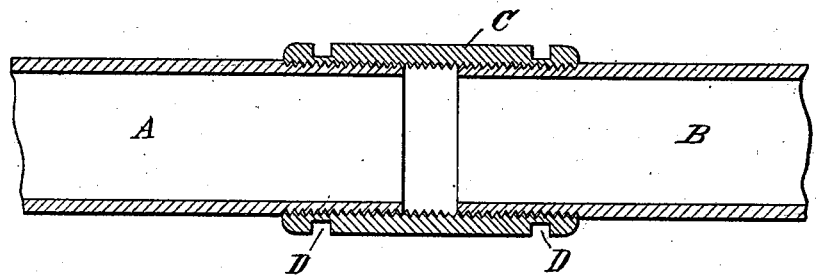
Figure 2:
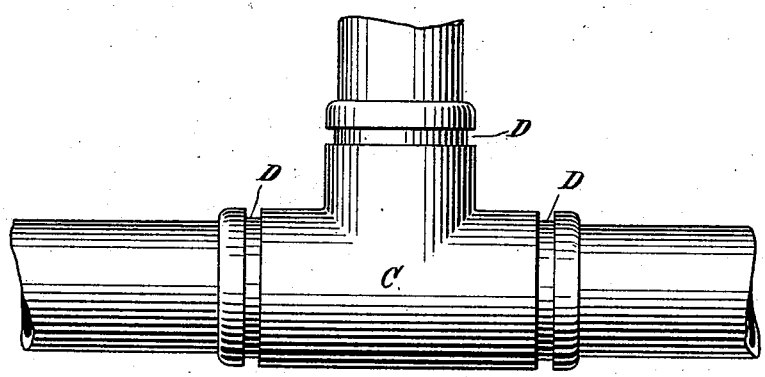
Figure 3:
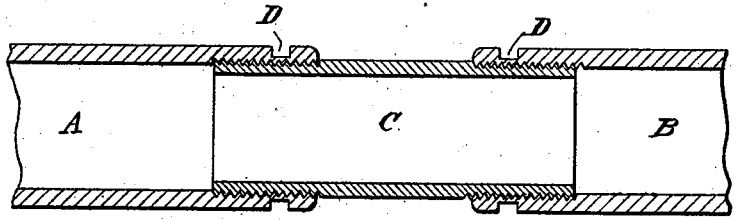

Figure 1 illustrates in central longitudinal section the ends of two pipes joined by my improved coupling, and Figs. 2 and 3 similar views of modifications.

A B represent the pipe-sections to be joined. They may be of the ordinary character of iron or steel and are externally and oppositely threaded at their ends.

C is an internally-threaded sleeve or pipe-section forming a coupler of the usual character, except that it must be of a material sufficiently malleable to accomplish the purpose hereinafter described. In the sleeve C are cut two, or it may be more, circumferential grooves D D to thin the metal at at least one point over each pipe-section. After the pipes are joined by the sleeve or coupling C a tool, such as an ordinary pipe-cutter, but with a blunt edge-wheel, is employed to force the material of the coupling under the grooves D down firmly into the threads of the pipe-section.

The coupling C may be adapted to connect three or more pipes, as shown in Fig. 2, or the coupling might be arranged to screw into the ends of the pipes instead of over them, in which case the grooves D would be cut in the pipes and the material of the pipe forced into the threads of the coupling. By severe tests I have found that by this means a remarkably perfect and tight joint may be secured and maintained in pipes subjected to heavy pressure or those used for conveying fluids that ordinary joints fail to prevent from leaking.

It is obvious that a coupling of this kind is no more expensive than an ordinary coupling, while it possesses all the advantages of the more expensive and complicated devices heretofore used.

What I claim as my invention is—

1. A sleeve or coupling for pipes composed of malleable metal internally threaded to receive the correspondingly threaded ends of pipe sections and containing two external circumferential grooves or portions reduced in thickness near its ends, as and for the purpose set forth.

2. The combination with pipe sections having threaded ends of a threaded sleeve or coupling having portions of reduced thickness over each pipe section compressed into the threads of said pipe sections, as set forth.

3. The combination with pipe sections externally threaded, of a coupling internally threaded and containing circumferential grooves at or near its ends and compressed or forced around such grooves into the threads of the pipe sections, as set forth.

In testimony whereof I have hereunto set my hand this 9th day of May, 1895.

JOSEPH P. DWYER.

Witnesses:
JAMES WILLS,
ERNEST HOPKINSON.